United States Patent [19]

Tsugei et al.

[11] Patent Number: 4,656,317

[45] Date of Patent: Apr. 7, 1987

[54] HANDWRITTEN CHARACTER INPUT DEVICE

[75] Inventors: Shinji Tsugei; Shigeki Iguchi, both of Nara, Japan

[73] Assignee: Sharp Kabushiki Kaisha, Osaka, Japan

[21] Appl. No.: 697,223

[22] Filed: Jan. 31, 1985

[30] Foreign Application Priority Data

Feb. 8, 1984 [JP] Japan .............................. 59-16943[U]

[51] Int. Cl.$^4$ .............................................. G06K 9/10
[52] U.S. Cl. .......................................... 178/18; 382/13
[58] Field of Search ....................... 178/18, 19; 382/13, 382/61; 340/723, 756

[56] References Cited

U.S. PATENT DOCUMENTS 4,471,162  9/1984  Aono et al. ...................... 178/18 X
4,562,304 12/1985  Ward et al. ........................ 178/18

Primary Examiner—Stafford D. Schreyer
Attorney, Agent, or Firm—Flehr, Hohbach, Test, Albritton & Herbert

[57] ABSTRACT

A device for inputting handwritten information comprises an input device for detecting handwritten information in specified areas on a tablet and a memory for storing such information according to the categories so that the data can be collected and processed quickly and easily.

3 Claims, 7 Drawing Figures

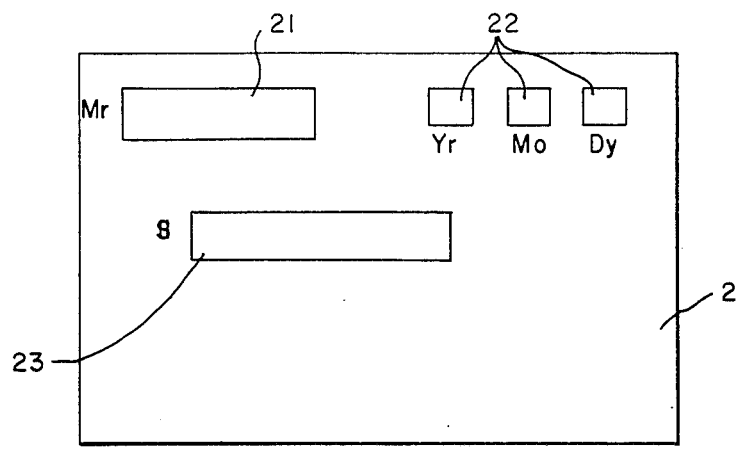
FIG. — 2
| NAME | DATE | PRICE |
|---|---|---|
| JOHN DOE | 11-4-83 | 1,000.00 |
| MARY SMITH | 11-5-83 | 250.00 |
| R.J. BROWN | 11-6-83 | 2,600.00 |
|  |  |  |
|  |  |  |
|  |  |  |
|  |  |  |
|  |  |  |
|  |  |  |
| TOTAL |  | 3,850.00 |
FIG. — 7

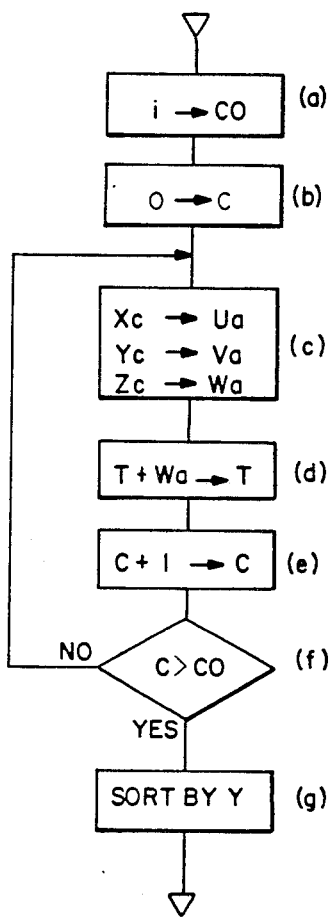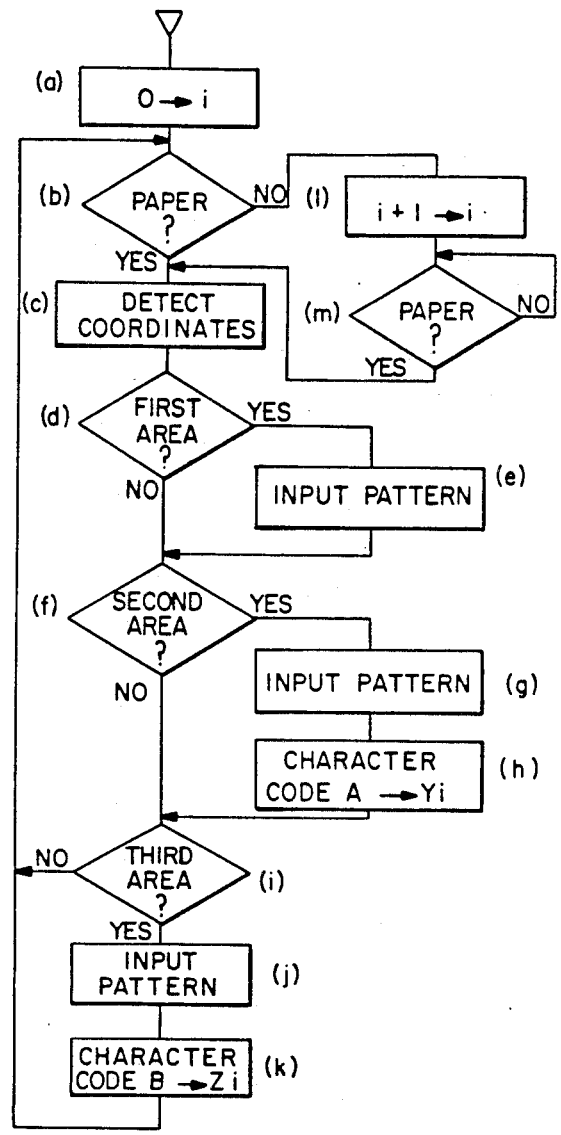
FIG. — 6  FIG. — 4

HANDWRITTEN CHARACTER INPUT DEVICE

BACKGROUND OF THE INVENTION

This invention relates to a device for processing handwritten input information which, having a tablet for placing thereupon a sheet of format paper such as a receipt, an estimate, a ticket, a bill or a stock certificate and reading the information handwritten in each write area in order to store it according to its category, can significantly simplify the processing such as classification of such stored information.

One of the conventional methods of data management for documents such as receipts and bills is to prepare a plurality of copies at the time of issuing the original and to save one of the copies for processing later. Another method is to enter the data into a personal computer and to prepare receipts and bills by a printer. The problem with the former method is that it is both time-consuming and cumbersome to collect or classify the data at a later time, while the latter method is disadvantageous in that a skill is required for the input of data and also that it cannot be used easily and quickly, for example, by a salesman on a visit.

It is therefore an object of this invention to provide a very practical processing device for handwritten input information which can read information instantly as it is written by hand as conventionally done when a receipt or a bill was issued, and store such information immediately according to its category so that the stored information can be processed conveniently at a later time.

BRIEF DESCRIPTION OF THE DRAWINGS

FIG. 2 shows an example of format paper.

FIG. 4 is a flow chart showing the operation of the device of FIG. 1.

FIG. 6 is a flow chart showing the processing of the computer of FIG. 5.

FIG. 7 is an example of display of the processed itemized data.

DETAILED DESCRIPTION OF THE INVENTION

Figure 1:
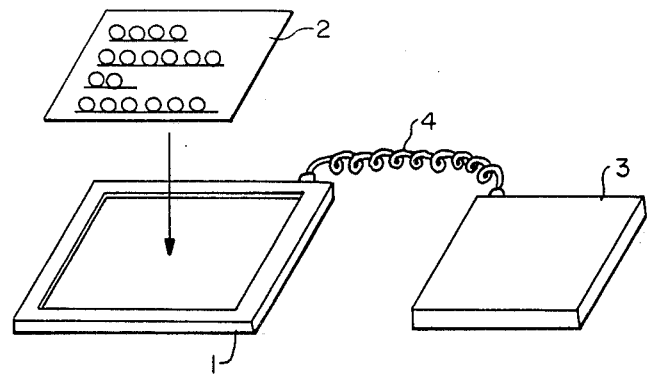
FIG. 1 is a general external view of a handwritten character input device according to the present invention.

FIG. 1 shows a handwritten character input device according to the present invention wherein numeral 1 indicates a handwritten character input means which inputs handwritten information not as code data but as pattern data. Numeral 2 shows a format sheet of paper such as a receipt to be placed on the input means 1. This format paper 2 is provided with write areas, as shown in FIG. 2, such as areas for writing a name ("name area" 21), a date ("date area" 22) and a price ("price area" 23). Writing in these areas is typically effected with the paper 2 disposed on the input means 1. Numeral 3 is a data processing means for storing separately according to categories the handwritten information transmitted to it through a line 4 and comprises an input-output interface, a ROM, a RAM and a central processing unit.

Figure 3:
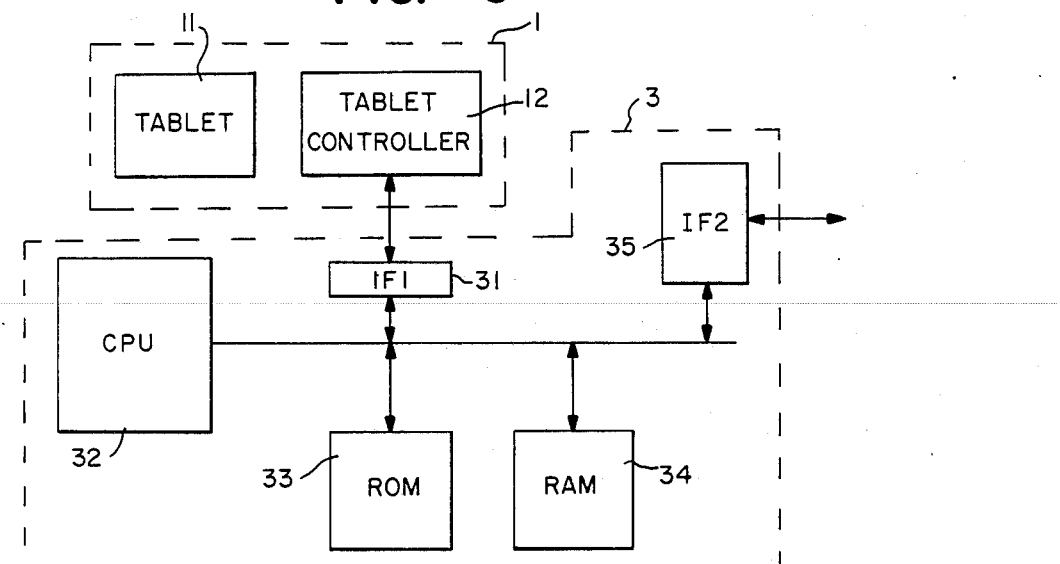
FIG. 3 is a block diagram showing the structure of the device of FIG. 1.

FIG. 3 is a block diagram of this device. The input means 1 is composed of a tablet 11 of an electromagnetic induction type and a tablet controller 12 which detects the position of a pen (not shown) on the tablet 11 and outputs it as coordinate information. The tablet 11 may be of the conventional type used in a digitizer for a personal computer comprising mutually insulated X- and Y-direction loop coils embedded on separate layers, the parallel lines of these loop coils forming a rectangular mesh. The ends of the parallel lines are connected together separately for the X- and Y-direction loop coils and a switching controller comprising an analog switching integrated circuit is provided for each layer. When a pen, which is a cursor provided with an exciting coil, is placed on the tablet 1, electromotive forces are induced in the loop coils and the address of the loop coil inducing the maximum electromotive force determines the position of the pen.

The data processing means 3, on the other hand, includes a first interface circuit 31 adapted to serially input signals outputted from the tablet controller 12, a central processing unit (CPU) 32, a memory means (ROM) 33 for storage of operation control programs, another memory means (RAM) 34 which contains itemized memory areas for storing information according to categories as well as memory areas for variable names, etc., and a second interface circuit 35 for transferring information to an external device.

FIG. 4 is an operation flow chart according to a program stored in the ROM 33. Operation of the device of this invention will be explained below by means of this flow chart.

First, the pointer i is reset (a) and it is then determined whether format paper 2 is on the tablet 11 (b). A photodetector, for example, may be utilized for the latter purpose. If it is determined that format paper 2 is placed on the tablet 11, the pen position is determined (c), or it is determined whether the pen coordinates indicate that the pen is on the name area (first area) 21 of the paper 2, the date area (second area) 22 or the price area (third area) 23. If it is determined that the pen position is in the name area 21 (d), the input pattern written in the name area 21 is directly entered into the memory area $X_i$ of the RAM 34 (e), where X, in this example, indicates that this memory area is for storing information written in the name area 21 and the subscript shows that it is the ith of such memory areas.

If it is determined that the pen position is in the date area 22 (f), the input pattern written in the date area 22 is inputted first into a first accumulator A(g). Character recognition of this input pattern is effected and its character code information is inputted into the memory area $Y_i$ of the aforementioned itemized memory means RAM 34 (h).

If the pen position is in the price area 33 (i), the input pattern written in the price area 23 is inputted first into a second accumulator B (j), character recognition of this input pattern is effected, and its character code information is inputted into the memory area $Z_i$ of the RAM 34 (k).

Information handwritten in the write areas 21, 22 and 23 of the format paper 2 is thus read by the input means 1, transferred then to the data processing means 3, and stored in the RAM 34 according to the category of the information. When the format paper 2 is removed from the tablet 11 after the necessary writing has been completed, the pointer i is updated (1) and the system waits for the next format paper to be placed (m).

Figure 5:
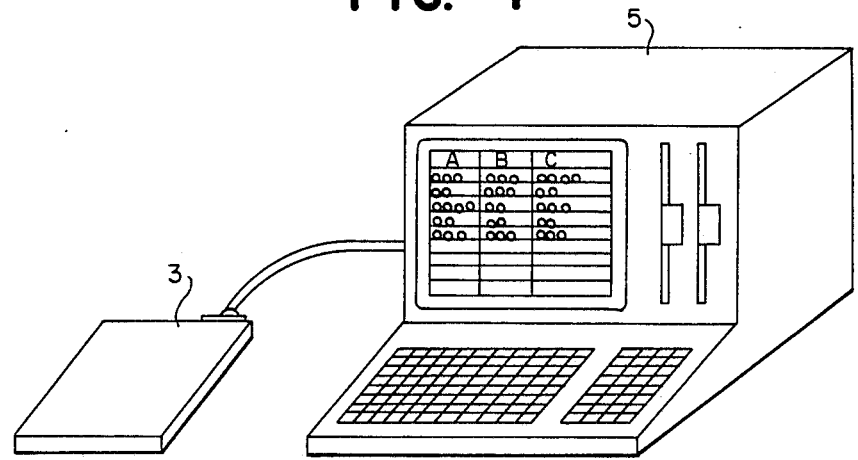
FIG. 5 is a general external view of the connection of the device of FIG. 1 with a host computer.

The data thus stored in the itemized memory means of the data processing means 3 can be classified or otherwise processed and the results can be displayed on a CRT display unit, for example, by loading on a host computer 5 as shown in FIG. 5.

FIG. 6 is a flow chart for the processing of itemized data in the data processing means 3 by the host computer 5. At the beginning, the value of pointer i, or the input count of itemized data by different format paper 2, is set in a counter CO (a) and another counter C is reset (b). Next, the first itemized data $X_0$, $Y_0$ and $Z_0$ in the itemized memory means (the data entered from the first sheet of format paper 2) are stored in itemized memory $U_a$, $V_a$ and $W_a$ of the host computer 5 (c). The counter C is then operated (e) after the price data in memory $W_a$ are entered in a memory means T for storing the total (d). The contents of the counters C and CO are compared (f) and, if C is not greater than CO, the system returns to the step (c) for loading itemized data.

After all data are loaded from the itemized memories of the data processing means 3, the host computer 5 can, for example, sort the itemized data in the order of dates (g) and display not only the total price but also the individual data in the order of dates as shown in FIG. 7.

If format paper of a different type is used, this naturally affects the input coordinates of the items to be entered. The device may be so designed that an appropriate program can be selected in accordance with the type of format paper to be used, thereby adjusting the input coordinates.

A handwritten character input device of the present invention described above can collect data quickly and easily because as soon as important items are written on a format sheet, the written data can be stored in a memory means. Moreover, since data are stored according to their categories, they can be classified and rearranged much more easily.

The present invention has been described above in terms of a preferred embodiment. The above description, however, is to be considered as illustrative rather than as limiting, and this invention is accordingly to be broadly construed. For example, it need not be a requirement that any format paper 2 should be placed on the tablet 11 if an appropriate combination is made between the tablet 11 and the display means. In such a case, the flowchart of FIG. 4 must naturally be modified appropriately. The scope of the invention is limited only by the following claims.

What is claimed is:

1. A device for input of handwritten information comprising
   an input means which includes a tablet and a controller means for detecting and outputting information handwritten in specified areas on said tablet,
   itemized memory means having memory areas for storing information according to categories,
   a loading means for causing output information from said input means to be stored in said memory areas according to categories of said output information, said loading means including means to add numbers sequentially entered through said input means,
   a formating sheet adapted to be placed on said tablet and to define said specified areas thereon, and
   a pen which contains an exciting coil and is adapted to be used for writing information on said tablet, said tablet being of an electromagnetic induction type containing loop coils.

2. The device of claim 1 wherein said loading means includes a computer.

3. The device of claim 1 wherein said itemized memory means is also adapted to store the sum of said added numbers.

* * * * *